(12) United States Patent
Park (10) Patent No.: US 7,381,896 B2
(45) Date of Patent: Jun. 3, 2008

(54) WIRE HIDING DEVICE AND ELECTRIC APPARATUS HAVING THE SAME

(75) Inventor: Jae Hoo Park, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/698,136

(22) Filed: Jan. 26, 2007

(65) Prior Publication Data

US 2007/0272427 A1 Nov. 29, 2007

(30) Foreign Application Priority Data

May 29, 2006 (KR) .................... 10-2006-0048253

(51) Int. Cl.
*H02G 3/00* (2006.01)
(52) U.S. Cl. .................. 174/68.3; 174/68.1; 174/72 A; 174/95; 52/105; 138/104
(58) Field of Classification Search ............... 174/48, 174/68.1, 68.3, 135, 72 A, 95, 96, 97, 101, 174/98, 100; 52/105, 220.3, 220.5, 220.7; 138/104, 106; 361/683; 439/92, 95, 98, 439/142; 285/81, 390
See application file for complete search history.

(56) References Cited

U.S. PATENT DOCUMENTS

| | | | |
|---|---|---|---|
| 2,090,239 A * | 8/1937 | Strang ................. | 138/116 |
| 4,258,515 A | 3/1981 | Owen | |
| 4,856,216 A * | 8/1989 | Gross .................. | 40/559 |
| 6,437,244 B1* | 8/2002 | Vander Velde ......... | 174/68.3 |
| 6,910,311 B2* | 6/2005 | Lindberg et al. ....... | 52/731.9 |
| 7,060,901 B2* | 6/2006 | Herzog et al. ......... | 174/66 |

FOREIGN PATENT DOCUMENTS

KR  10-2004-0103617 A  12/2004

* cited by examiner

*Primary Examiner*—Dhiru R Patel
(74) *Attorney, Agent, or Firm*—Sughrue Mion, PLLC (57) ABSTRACT

A wire hiding device includes an accommodating part for accommodating an electric wire, and a transparent cover part provided around the accommodating part, the transparent cover part being provided with an opening at a rear portion, through which an image at the rear portion of the transparent cover part is exposed. The transparent cover part includes a magnifying-projecting portion, through which the image is magnified and projected forward. The accommodating part is located at a zone where an image of the accommodating part is incapable of being projected forward through the magnifying-projecting portion. The wire hiding device is not easily seen by an observer and even looks just like a part of an indoor environment, and the electric wire is invisible to an observer.

16 Claims, 6 Drawing Sheets

WIRE HIDING DEVICE AND ELECTRIC APPARATUS HAVING THE SAME

CROSS-REFERENCE TO RELATED APPLICATIONS

This application claims priority from Korean Patent Application No. 2006-0048253, filed on May 29, 2006 in the Korean Intellectual Property Office, the disclosure of which is incorporated herein by reference.

BACKGROUND OF THE INVENTION

1. Field of the Invention

Apparatuses consistent with the present invention relate to a wire hiding device and, more particularly, to a wire hiding device and electric apparatus having the same capable of hiding and protecting an electric wire and not being easily seen by an observer.

2. Description of the Related Art

In general, an electric apparatus such as a television (TV), a refrigerator, an air conditioner, a stereo, a computer or the like is equipped with electric wires connected to a main body, through which power is supplied or signals are transmitted. When the electric wires are exposed outside, the appearance of a room interior is spoiled, and the electric wires are trodden on by people or crushed by furniture, which causes breakage of wire or damage to the wire coating or casing. Conventionally, a wire protecting cover has been used for shielding the electric wires after installing the electric apparatus.

A conventional wire protecting cover is disclosed in Korean Patent Laid-open Publication No. 2004-103617. Such a wire protecting cover includes a base part which is attached to a wall or a floor of a room, and a cover part which covers the base part to provide a wire accommodating space with the base part, to thereby shield the electric wires and protect the same.

However, the wire protecting cover itself is also exposed to person's sight. As such, when the color of the wire protecting cover does not match with the room color, the aesthetics of the room interior is further spoiled. Especially, when mounting an electric apparatus like a PDP (Plasma Display Panel) TV on a wall, the wire protecting cover should also be mounted on the wall. Accordingly, the wire protecting cover is more easily exposed to person's sight, thereby causing a degradation of the aesthetics of the room interior.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

It is an aspect of the invention to provide a wire hiding device capable of hiding and protecting an electric wire and not being easily seen by an observer.

It is another aspect of the invention to provide an electric apparatus having the above wire hiding device.

Consistent with one aspect, an exemplary embodiment of the present invention provides a wire hiding device comprising: an accommodating part for accommodating at least one electric wire; and a transparent cover part provided around the accommodating part, the transparent cover part being provided with an opening at a rear portion, through which an image at the rear portion of the transparent cover part is exposed. The transparent cover part includes a magnifying-projecting portion, through which the image is magnified and projected forward.

The accommodating part may be located at a zone where an image of the accommodating part is incapable of being projected forward through the magnifying-projecting portion.

The transparent cover part further includes an empty space provided around the accommodating part inside the transparent cover part.

The magnifying-projecting portion may have a cross-section of a convex lens shape.

The transparent cover part further includes a front panel and a pair of side panels extending rearward from both side ends of the front panel, the front panel being divided along a longitudinal axis into a first magnifying-projecting portion and a second magnifying-projecting portion.

The accommodating part may be located in an inner-middle of the transparent cover part.

The accommodating part includes an inserting slot at a rear portion through which the at least one electric wire is inserted into the accommodating part, flexible blocking portions provided at both sides of the inserting slot for preventing the electric wire from being separated from the accommodating part, and a connecting portion extending from the accommodating part and connected to a boundary between the first magnifying-projecting portion and the second magnifying-projecting portion.

The accommodating part may be made from a transparent material, and formed integrally with the transparent cover part.

The transparent cover part further includes adhering panels extending inward from rear ends of the pair of side panels, the adhering panels having a width larger than a thickness of the side panels.

Consistent with another aspect, an exemplary embodiment of the present invention provides an electric apparatus comprising: a main body; at least one electric wire extending outside from the main body; and a wire hiding device for accommodating and hiding the electric wire.

The wire hiding device includes an accommodating part for accommodating the at least one electric wire, and a transparent cover part provided around the accommodating part, the transparent cover part being provided with an opening at a rear portion, through which an image at the rear portion of the cover part is exposed. The transparent cover part includes a magnifying-projecting portion, through which the image is magnified and projected forward.

The accommodating part may be located at a zone where an image of the accommodating part is incapable of being projected forward through the magnifying-projecting portion.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Reference will now be made in detail to exemplary embodiments of the present invention, examples of which are illustrated in the accompanying drawings, wherein like reference numerals refer to like elements throughout. The exemplary embodiments are described below to explain the present invention by referring to the figures.

Figure 1:
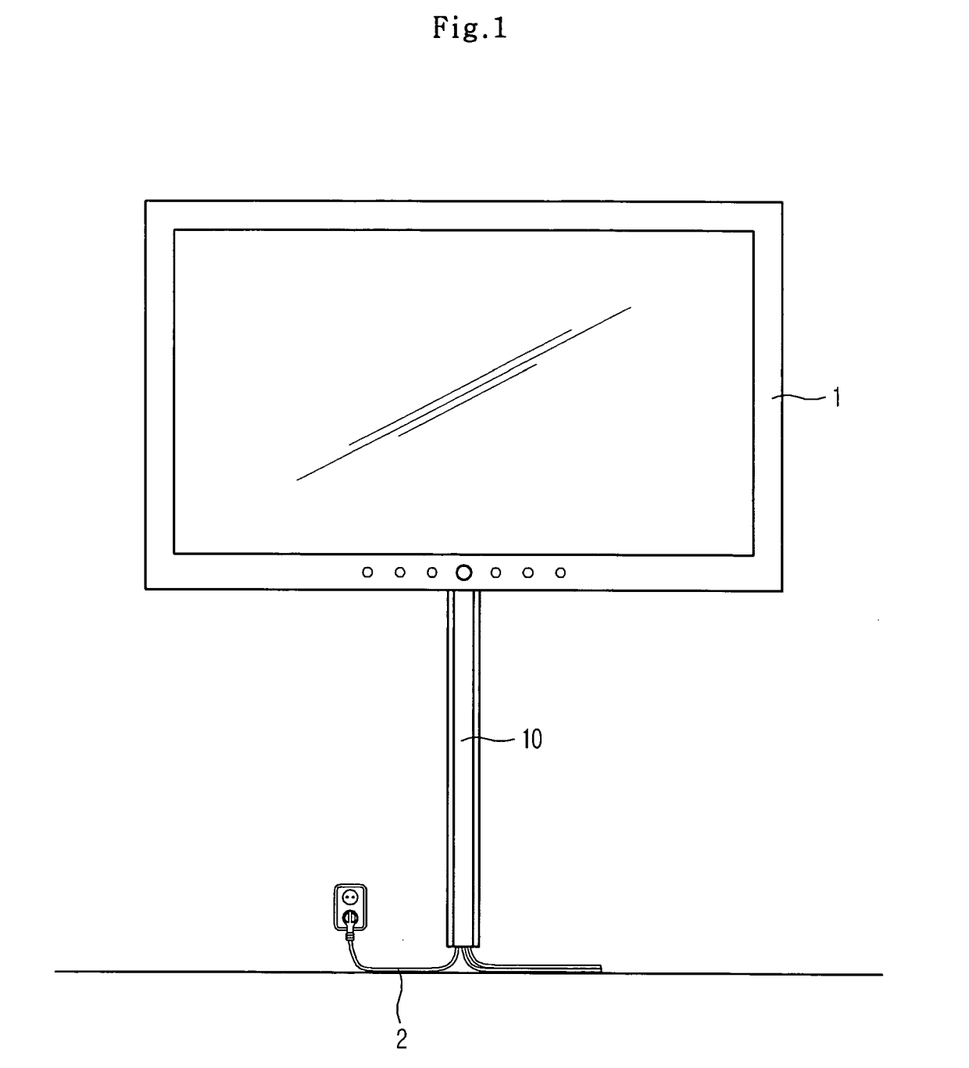
FIG. 1 is a front view showing an electric apparatus having a wire hiding device in accordance with an exemplary embodiment of the present invention.
Figure 2:
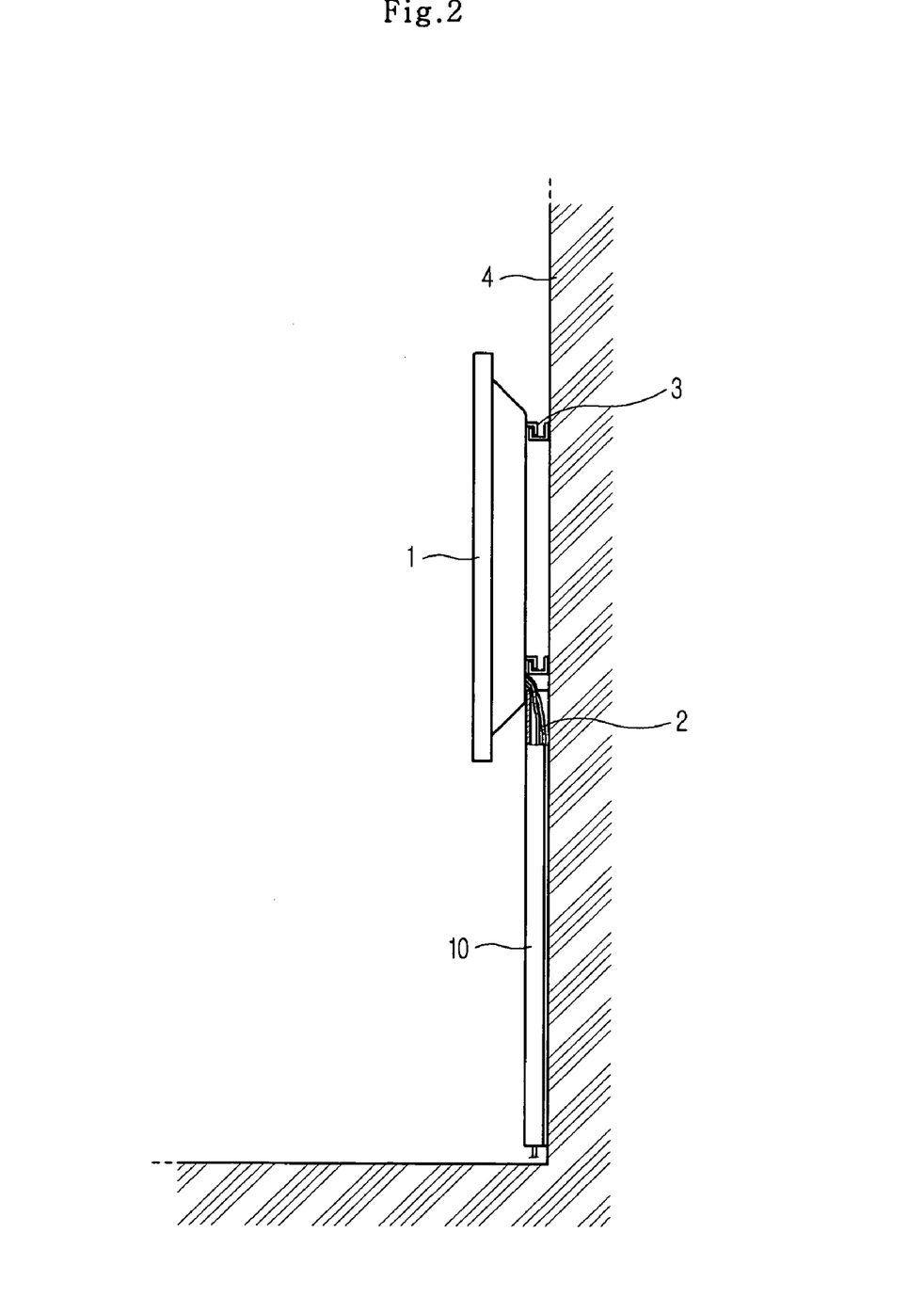
FIG. 2 is a side view showing an electric apparatus having a wire hiding device in accordance with an exemplary embodiment of the present invention.

FIGS. 1 and 2 are front and side views, respectively, showing an electric apparatus having a wire hiding device consistent with the present invention. In this embodiment, a wall-mounted TV like a PDP TV is used as an example of the electric apparatus. The TV comprises a main body 1 which is mounted to a wall 4 of a room, electric wires 2 through which power is supplied to the main body 1 or image signals are transmitted, and a wire hiding device 10 for hiding and shielding the electric wires 2.

The main body 1 is fixed to the wall 4 by a fixing device 3 provided at a rear portion of the main body 1. The electric wires 2 extend lengthwise outside from the main body 1. The wire hiding device 10 accommodates the electric wires 2 and is attached to the wall 4, so as to hide and shield the electric wires 2 and protect the same from exterior shocks.

Figure 3:
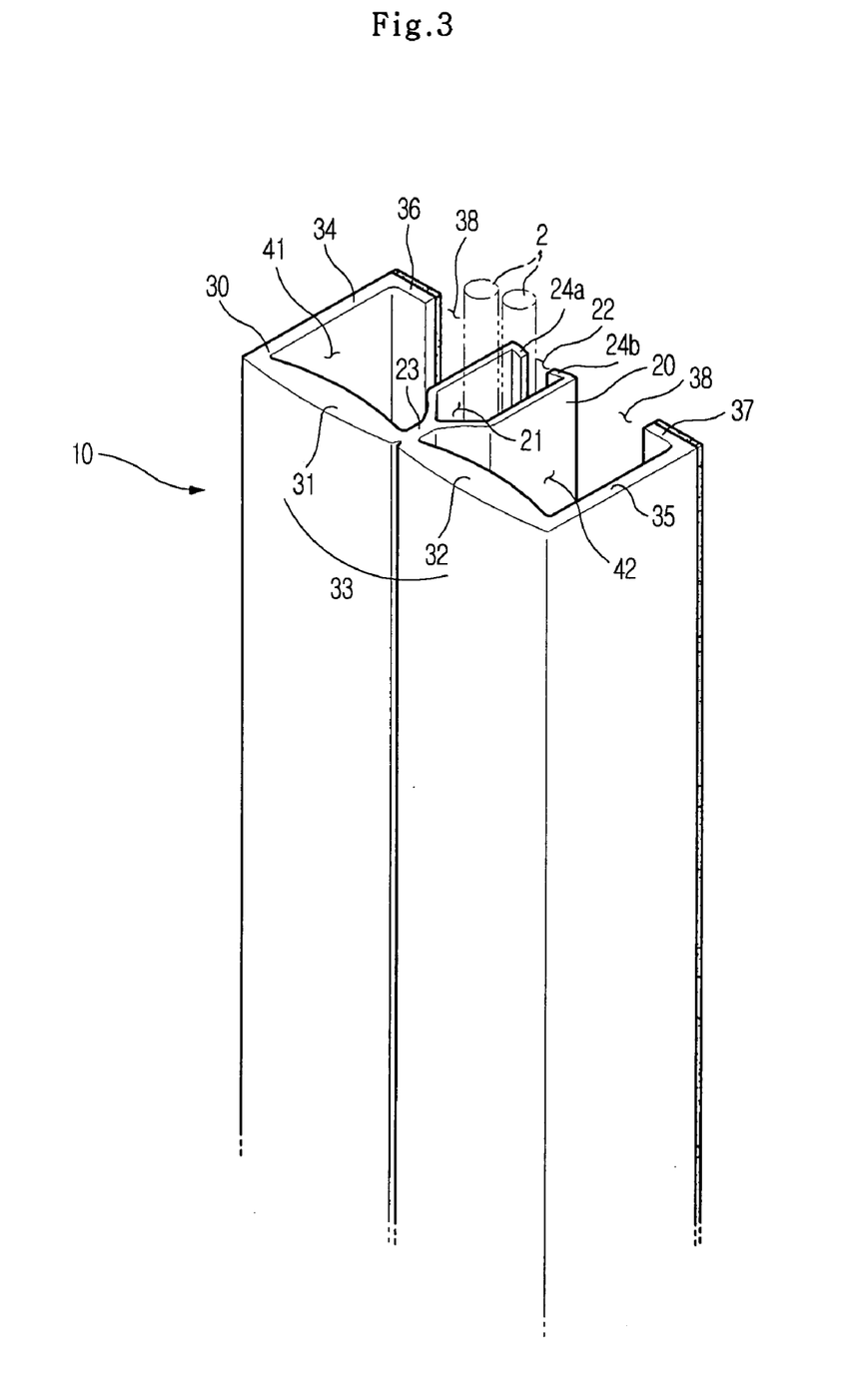
FIG. 3 is a perspective view showing a wire hiding device in accordance with a first embodiment of the present invention.
Figure 4:
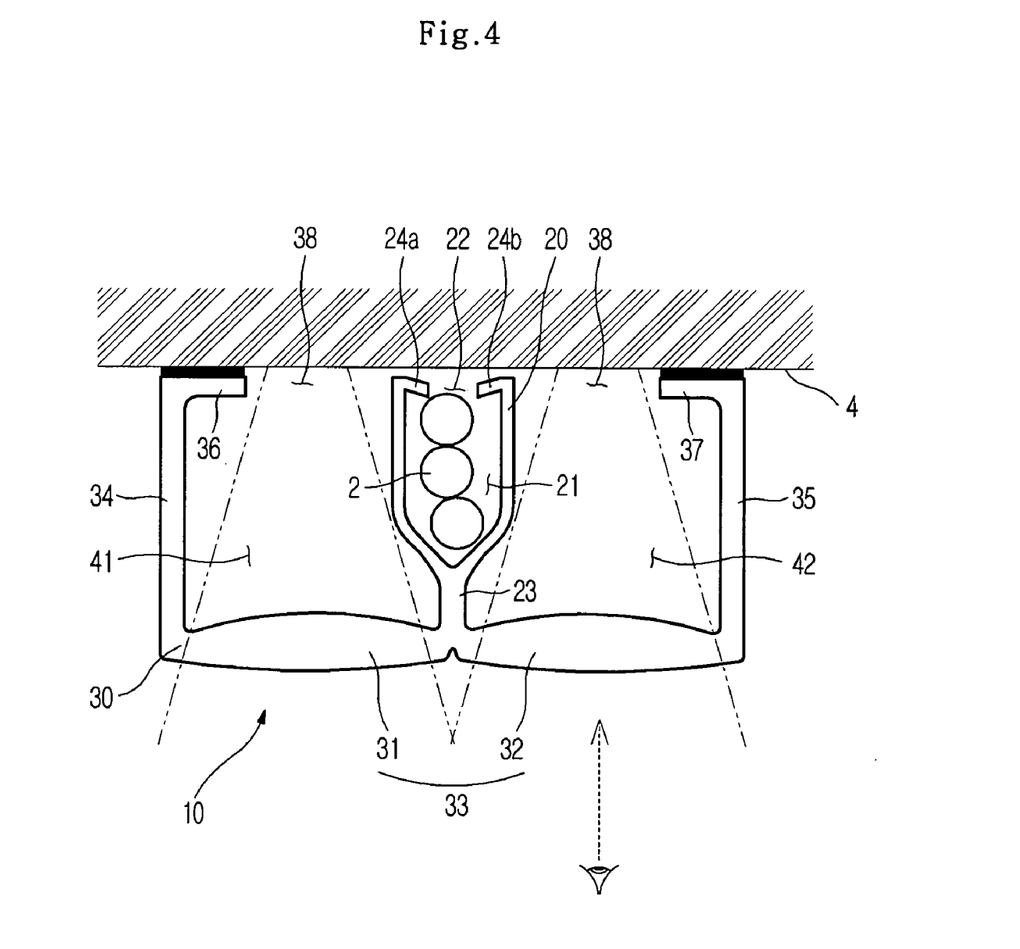
FIG. 4 is a cross-sectional view showing a wire hiding device depicted in FIG. 3.

FIGS. 3 and 4 are perspective and cross-sectional views, respectively, showing the wire hiding device in accordance with a first embodiment of the present invention. As shown in the drawings, the wire hiding device 10 comprises an accommodating part 20 for accommodating the electric wires 2, and a cover part 30 which is provided around the accommodating part 20. The cover part 30 is provided with openings 38 at its rear portion. The openings 38 may be formed at left and right sides of the accommodating part 20. An image on the wall 4 is exposed through the openings 38.

The accommodating part 20 defines an accommodating space 21, and is provided with an inserting slot 22 at its rear portion, through which the electric wires 2 are inserted into the accommodating space 21. A front portion of the accommodating part 20 is formed in a streamline shape. A connecting portion 23 extends from a front end of the streamlined front portion of the accommodating part 20, and is connected to an inner surface of the cover part 30. Blocking portions 24a and 24b are formed at rear ends of a pair of side walls of the accommodating part 20 while extending inward. In other words, a gap between the blocking portions 24a and 24b is a width of the inserting slot 22. The blocking portions 24a and 24b prevent the electric wires 2 from being separated from the accommodating space 21. So as to expand the width of the inserting slot 22 for easily inserting the electric wires 2 into the accommodating space 21, the blocking portions 24a and 24b may be made from a flexible material, or the accommodating part 20 itself may be made from a flexible material.

The cover part 30 includes a front panel 33, a pair of side panels 34 and 35 extending rearward from both side ends of the front panel 33, and a pair of adhering panels 36 and 37 extending inward from rear ends of the pair of side panels 34 and 35. The adhering panel has a width larger than a thickness of the side panel, so as to securely attach the wire hiding device 10 to the wall 4.

The cover part 30 and the accommodating part 20 may be formed integrally with each other by an injection molding, and have a length that is long enough to accommodate long electric wires 2. The cover part 30 and the accommodating part 20 are made from a transparent material, such as polycarbonate, acryl, ABS (Acrylonitrile Butadiene Styrene) resin, glass or the like.

The front panel 33 of the cover part 30 is divided along its longitudinal axis into a first magnifying-projecting portion 31 and a second magnifying-projecting portion 32, through which the image on the wall 4 exposed through the openings 38 is magnified and projected forward. The first and second magnifying-projecting portions 31 and 32 have a cross-section of a convex lens shape. The first and second magnifying-projecting portions 31 and 32 are located adjacent to each other.

As shown in FIG. 4, the first and second magnifying-projecting portions 31 and 32 are configured such that both the front surface and the rear surface are convex, however, they are not limited thereto. The magnifying-projecting portion may be formed to have a flat front surface and a convex rear surface, to have a convex front surface and a flat rear surface, or to have a convex front surface and a concave rear surface having a larger radius of curvature than the convex front surface. In addition, the magnifying-projecting portion can be modified in various other shapes capable of magnifying and projecting the image on the wall 4 forward.

The accommodating part 20 is located in an inner-middle of the cover part 30. This position of the accommodating part 20 is a so-called "dead zone" where an image of the accommodating part 20 cannot be projected forward through the first and second magnifying-projecting portions 31 and 32. The connecting portion 23 extending from the front end of the accommodating part 20 is connected to a boundary between the first magnifying-projecting portion 31 and the second magnifying-projecting portion 32. Inside the cover part 30 are provided empty spaces 41 and 42 defined by the first and second magnifying-projecting portions 31 and 32, side panels 34 and 35 and the accommodating part 20. The empty spaces 41 and 42 enable the image on the wall 4 to be magnified and projected forward through the first and second magnifying-projecting portions 31 and 32 without any interference.

Hereinafter, the operational effect of the wire hiding device of the present invention will be described.

As shown in FIG. 4, when attaching the wire hiding device 10 to the wall 4 after inserting the electric wires 2 into the accommodating part 20, the image on the wall 4 is exposed through the openings 38 and is magnified and projected forward through the first and second magnifying-projecting portions 31 and 32. Therefore, deterioration of the aesthetics of a room interior due to the installation of the wire hiding device 10 can be minimized.

Since the wire hiding device 10 is made from a transparent material, the device 10 itself is not easily exposed to person's sight. Furthermore, since a pattern or color of the wall 4 is magnified and projected forward through the first and second magnifying-projecting portions 31 and 32, to an observer's eyes the front panel 33 of the wire hiding device 10 looks just like a part of the wall 4, thereby minimizing the visual exposure of the wire hiding device 10.

Also, since the accommodating part 20 and the electric wires 2 accommodated therein are positioned at the "dead zone" where an image of the accommodating part 20 cannot be projected forward through the first and second magnifying-projecting portions 31 and 32, the accommodating part 20 is invisible to the person. Accordingly, while the electric wires 2 are actually accommodated in the wire hiding device 10, the electric wires 2 appear to be non-existent.

For mounting the wire hiding device 10, rear surfaces of the adhering panels 36 and 37 are coated with a bonding agent or an adhesive tape to be attached to the wall 4, a floor or the like. Though it is not shown in the drawings, an additional fixing device may be provided at the main body 1 of the electric apparatus for fixing an end of the wire hiding device 10 to the main body 1. If using such an additional fixing device, the wire hiding device 10 can be installed without being attached to the wall 4.

Figure 5:
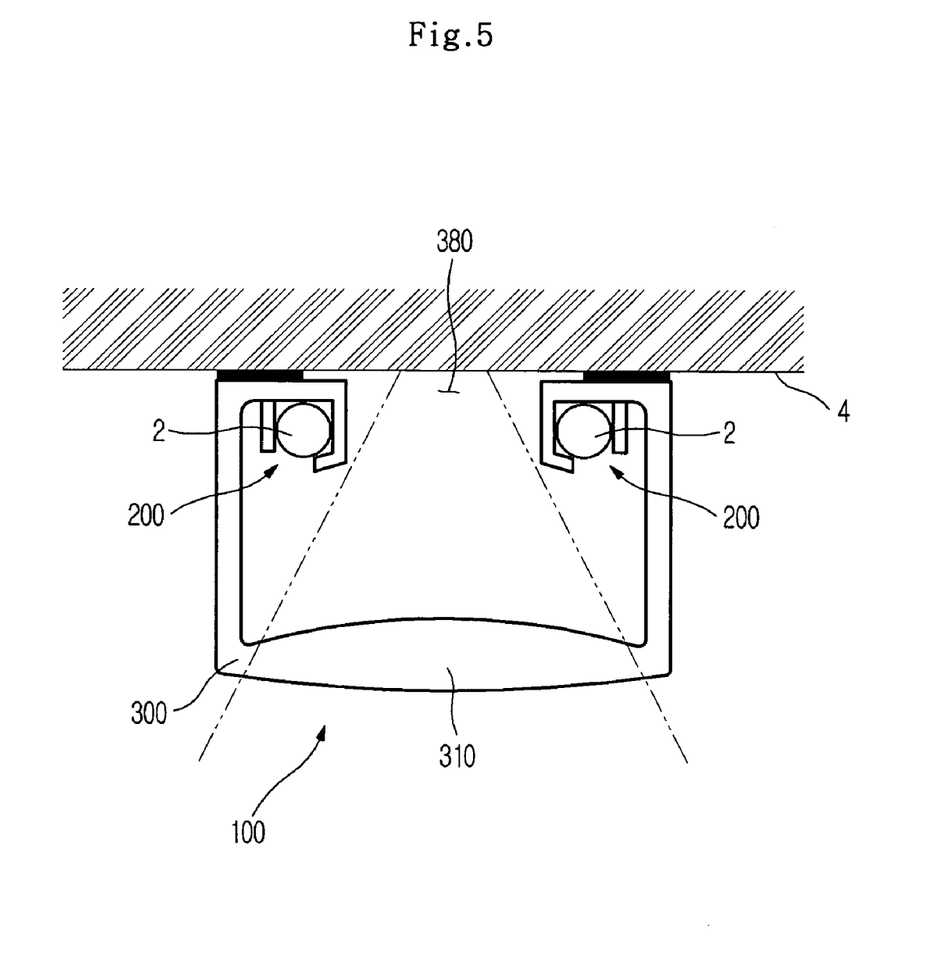
FIG. 5 is a cross-sectional view showing a wire hiding device in accordance with a second embodiment of the present invention.

FIG. 5 is a cross-sectional view showing a wire hiding device in accordance with a second embodiment of the present invention.

As shown in the drawing, a wire hiding device 100 according to the second embodiment of the present invention comprises a transparent cover part 300 and transparent accommodating parts 200 which are located at inner-rear corners of the cover part 300. The cover part 300 includes a front panel 310, a pair of side panels extending rearward from both side ends of the front panel 310, and a pair of adhering panels extending inward from rear ends of the pair of side panels. An opening 380 is provided between the adhering panels, through which an image on the wall 4 is exposed.

The front panel 310 of the cover part 300 is an amplifying-projecting portion which has a cross-section of a convex lens shape. The inner-rear corners of the cover part 300, at which the accommodating parts 200 are located, are a "dead zone" where images of the accommodating parts 200 cannot be projected forward through the amplifying-projecting portion (i.e., the front panel 310).

In the same manner, since a pattern or color of the wall 4 is magnified and projected forward through the front panel 310, to an observer's eyes the front panel 310 looks just like a part of the wall 4. Further, since the accommodating parts 200 and the electric wires 2 accommodated therein are positioned at the "dead zone" where images of the accommodating parts 200 cannot be projected forward through the front panel 310, the accommodating parts 200 and the electric wires 2 are invisible to an observer.

Figure 6:
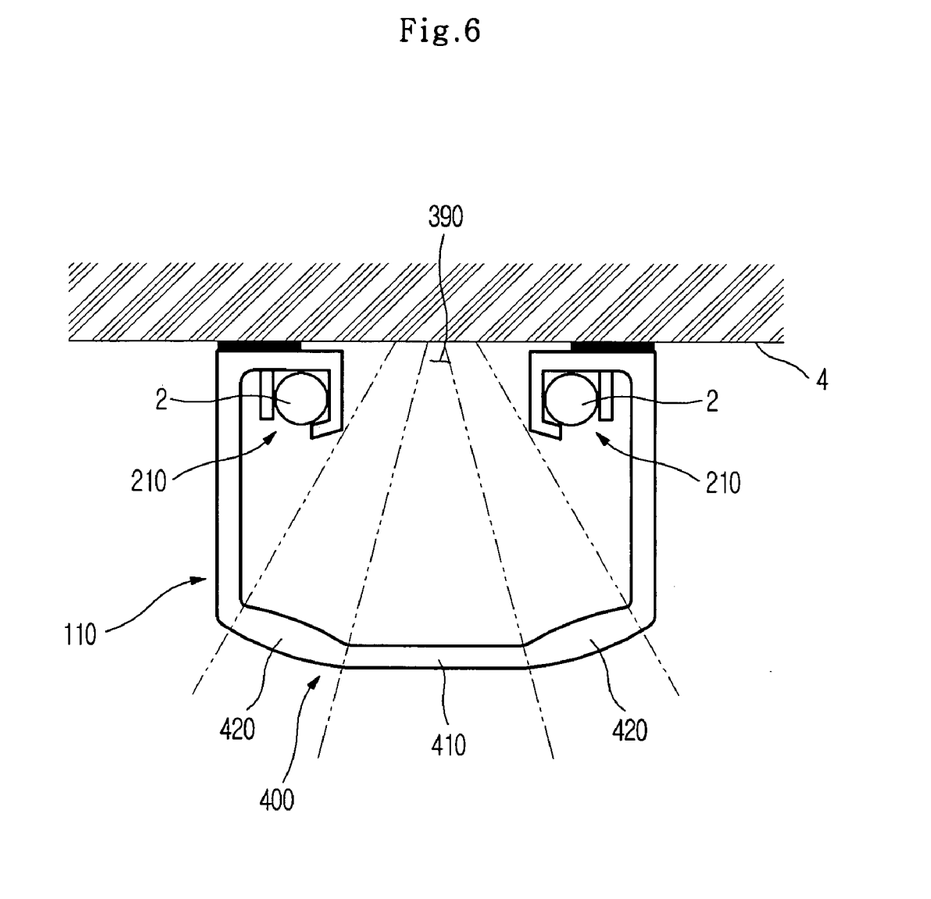
FIG. 6 is a cross-sectional view showing a wire hiding device in accordance with a third embodiment of the present invention.

FIG. 6 is a cross-sectional view showing a wire hiding device in accordance with a third embodiment of the present invention.

As shown in the drawing, a wire hiding device 110 according to the third embodiment of the present invention comprises a transparent cover part 400 and transparent accommodating parts 210 which are located at inner-rear corners of the cover part 400. The cover part 400 includes a front panel, a pair of side panels extending rearward from both side ends of the front panel, and a pair of adhering panels extending inward from rear ends of the pair of side panels. An opening 390 is provided between the adhering panels, through which an image on the wall 4 is exposed.

The front panel of the cover part 400 is divided along its longitudinal axis into a central flat portion 410, and magnifying-projecting portions 420 provided at both sides of the central flat portion 410. Each magnifying-projecting portion 420 has a cross-section of a convex lens shape. The inner-rear corners of the cover part 400, at which the accommodating parts 210 are located, are a "dead zone" where images of the accommodating parts 210 cannot be projected forward through the central flat portion 410 and the amplifying-projecting portions 420.

Similarly, a pattern or color of the wall 4 is projected forward through the central flat portion 410 as it is, and magnified and projected forward through the magnifying-projecting portions 420 provided at the both sides of the central flat portion 410. And, the accommodating parts 210 and the electric wires 2 accommodated therein are positioned at the "dead zone" where images of the accommodating parts 210 cannot be projected forward through the central flat portion 410 and the magnifying-projecting portions 420. Accordingly, the accommodating parts 210 and the electric wires 2 are invisible to an observer.

As apparent from the above description, the wire hiding device consistent with the present invention basically accommodates the electric wires to protect the same safely.

Also, since the wire hiding device is made from a transparent material and a pattern or color of an indoor environment is magnified and projected forward through the magnifying-projecting portion, the wire hiding device is not easily seen by an observer and even looks just like a part of the indoor environment.

Furthermore, since the electric wires in the accommodating part are positioned at the "dead zone" where an image of the accommodating part cannot be projected forward through the magnifying-projecting portion, the electric wires 2 are invisible to a person. Accordingly, deterioration of aesthetics of a room interior due to distribution of the electric wires and installation of the wire hiding device can be minimized.

Although exemplary embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A wire hiding device comprising:
    an accommodating part for accommodating at least one electric wire; and
    a transparent cover part provided around the accommodating part, the transparent cover part being provided with at least one opening at a rear portion, through which an image at the rear portion of the transparent cover part is exposed,
    wherein the transparent cover part includes a magnifying-projecting portion, through which the image is magnified and projected forward.

2. The device according to claim 1, wherein the accommodating part is located at a zone where an image of the accommodating part is incapable of being projected forward through the magnifying-projecting portion.

3. The device according to claim 1, wherein the transparent cover part further includes an empty space provided around the accommodating part inside the transparent cover part.

4. The device according to claim 1, wherein the magnifying-projecting portion has a cross-section of a convex lens shape.

5. The device according to claim 4, wherein the transparent cover part further includes a front panel and a pair of side panels extending rearward from both side ends of the front panel, the front panel being divided along a longitudinal axis into a first magnifying-projecting portion and a second magnifying-projecting portion, and the accommodating part is located in an inner-middle of the transparent cover part.

6. The device according to claim 5, wherein the accommodating part includes an inserting slot at a rear portion through which the at least one electric wire is inserted into the accommodating part, flexible blocking portions provided at both sides of the inserting slot for preventing the at least one electric wire from being separated from the accommodating part, and a connecting portion extending from the accommodating part and connected to a boundary between the first magnifying-projecting portion and the second magnifying-projecting portion.

7. The device according to claim 6, wherein the accommodating part is made from a transparent material, and formed integrally with the transparent cover part.

8. The device according to claim 5, wherein the transparent cover part further includes adhering panels extending inward from rear ends of the pair of side panels, the adhering panels having a width larger than a thickness of the side panels.

9. An electric apparatus comprising:
a main body;
at least one electric wire extending outside from the main body; and
a wire hiding device for accommodating and hiding the at least one electric wire,
wherein the wire hiding device includes an accommodating part for accommodating the at least one electric wire, and a transparent cover part provided around the accommodating part, the transparent cover part being provided with an opening at a rear portion, through which an image at the rear portion of the transparent cover part is exposed,
and wherein the cover part includes a magnifying-projecting portion, through which the image is magnified and projected forward.

10. The apparatus according to claim 9, wherein the accommodating part is located at a zone where an image of the accommodating part is incapable of being projected forward through the magnifying-projecting portion.

11. The apparatus according to claim 9, wherein the transparent cover part further includes an empty space provided around the accommodating part inside the transparent cover part.

12. The apparatus according to claim 9, wherein the magnifying-projecting portion has a cross-section of a convex lens shape.

13. The apparatus according to claim 12, wherein the transparent cover part further includes a front panel and a pair of side panels extending rearward from both side ends of the front panel, the front panel being divided along a longitudinal axis into a first magnifying-projecting portion and a second magnifying-projecting portion, and the accommodating part is located in an inner-middle of the transparent cover part.

14. The apparatus according to claim 13, wherein the accommodating part includes an inserting slot at a rear portion through which the at least one electric wire is inserted into the accommodating part, flexible blocking portions provided at both sides of the inserting slot for preventing the at least one electric wire from being separated from the accommodating part, and a connecting portion extending from the accommodating part and connected to a boundary between the first magnifying-projecting portion and the second magnifying-projecting portion.

15. The apparatus according to claim 14, wherein the accommodating part is made from a transparent material, and formed integrally with the transparent cover part.

16. The apparatus according to claim 13, wherein the transparent cover part further includes adhering panels extending inward from rear ends of the pair of side panels, the adhering panels having a width larger than a thickness of the side panels.

* * * * *